US011097368B2

(12) United States Patent
Vogel

(10) Patent No.: US 11,097,368 B2
(45) Date of Patent: Aug. 24, 2021

(54) WELDING OR CUTTING POWER SUPPLY USING PHASE SHIFT DOUBLE FORWARD CONVERTER CIRCUIT (PSDF)

(71) Applicant: ILLINOIS TOOL WORKS INC., Glenview, IL (US)

(72) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 728 days.

(21) Appl. No.: 14/613,016

(22) Filed: Feb. 3, 2015

(65) Prior Publication Data
US 2015/0144609 A1     May 28, 2015

Related U.S. Application Data

(63) Continuation of application No. 12/399,698, filed on Mar. 6, 2009, now Pat. No. 8,952,293.
(Continued)

(51) Int. Cl.
| | |
|---|---|
| *B23K 9/10* | (2006.01) |
| *H02M 3/335* | (2006.01) |
| *B23K 9/09* | (2006.01) |

(52) U.S. Cl.
CPC ............ *B23K 9/1043* (2013.01); *B23K 9/091* (2013.01); *B23K 9/1012* (2013.01); *H02M 3/3353* (2013.01); *H02M 3/33507* (2013.01)

(58) Field of Classification Search
CPC ...... B23K 9/1006; B23K 9/095; B23K 9/092; B23K 9/1056; B23K 9/091; H02M 3/22;
(Continued)

(56) References Cited

U.S. PATENT DOCUMENTS

| | | |
|---|---|---|
| 3,686,558 A | 8/1972 | Havas |
| 4,575,670 A | 3/1986 | Hignutt |
| (Continued) | | |

FOREIGN PATENT DOCUMENTS

| | | |
|---|---|---|
| EP | 0949751 | 10/1999 |
| JP | 10052754 | 2/1998 |
| (Continued) | | |

OTHER PUBLICATIONS

The English translation of Terayama (JP 10052754), Terayama, Kikuo.*

*Primary Examiner* — Robert J Utama
*Assistant Examiner* — Ayub A Maye
(74) *Attorney, Agent, or Firm* — McAndrews, Held & Malloy, Ltd.

(57) ABSTRACT

A technique for dynamically adjusting an output voltage for a welding or cutting operation is provided. The technique allows for varying output voltage at the welding or cutting torch by manipulating the duty cycles of two forward converter circuits. The present disclosure provides methods and systems for increasing synchronized duty cycles in a pair of forward converter circuits in response to increasing output voltage demand then changing a phase shift between the duty cycles in response to further increases in output voltage demand. The present disclosure provides a controller designed to receive input signals and generate output pulse width modulation signals that control the duty cycle width and phase shift of the outputs of the forward converter circuits in response to these signals. Methods of accommodating for the time needed for the transformer core to reset via leading edge or lagging edge compensation are provided.

14 Claims, 10 Drawing Sheets

Related U.S. Application Data

(60) Provisional application No. 61/036,598, filed on Mar. 14, 2008.

(58) Field of Classification Search
CPC .... H02M 3/24; H02M 3/1582; H02M 3/1584; H02M 3/3353
USPC .............. 219/130.1, 130.01, 121.39, 137 PS
See application file for complete search history.

(56) References Cited

U.S. PATENT DOCUMENTS

| | | | | |
|---|---|---|---|---|
| 4,628,426 A * | 12/1986 | Steigerwald | ...... | H02M 3/33561 336/184 |
| 5,099,202 A * | 3/1992 | Claydon | ................ | H02M 1/38 327/237 |
| 5,117,347 A | 5/1992 | Rebello | | |
| 5,583,753 A * | 12/1996 | Takayama | ............... | H02J 1/102 363/65 |
| 5,612,581 A * | 3/1997 | Kageyama | .............. | H02J 1/102 307/64 |
| 5,659,208 A * | 8/1997 | Kimble | ................ | H02M 3/285 307/146 |
| 5,751,150 A * | 5/1998 | Rippel | ............... | G01R 31/2841 324/537 |
| 5,991,169 A | 11/1999 | Kooken | | |
| 6,051,804 A * | 4/2000 | Reynolds | ............... | B23K 9/1043 219/121.45 |
| 6,291,798 B1 * | 9/2001 | Stava | ................... | B23K 9/1006 219/130.32 |
| 6,472,634 B1 * | 10/2002 | Houston | .............. | B23K 9/0953 219/130.5 |
| 6,750,637 B2 * | 6/2004 | Nagaki | ................... | H02J 1/102 323/272 |
| 6,956,752 B2 * | 10/2005 | Miermans | .......... | H02M 3/33561 363/65 |
| 7,002,815 B2 * | 2/2006 | Scarlatescu | ......... | H02M 1/4225 363/34 |
| 7,351,931 B2 | 4/2008 | Yoshida | | |
| 7,847,499 B2 * | 12/2010 | Nakamura | .............. | B60L 3/003 318/400.27 |
| 7,847,532 B2 * | 12/2010 | Potter | ....................... | G06F 1/26 307/18 |
| 7,855,905 B2 * | 12/2010 | Leung | ................... | H02M 3/157 323/284 |
| 8,358,082 B2 * | 1/2013 | Henry | ................ | H05B 41/2828 315/209 R |
| 9,855,620 B2 * | 1/2018 | Kooken | ............... | B23K 9/1075 |
| 2002/0056708 A1 * | 5/2002 | Moriguchi | ........... | B23K 9/1056 219/130.21 |
| 2004/0114397 A1 | 6/2004 | Liu | | |
| 2005/0046387 A1 | 3/2005 | Aker | | |
| 2005/0134220 A1 | 6/2005 | Brohlin | | |
| 2006/0226130 A1 | 10/2006 | Kooken | | |
| 2007/0103941 A1 | 5/2007 | Liu | | |
| 2008/0222443 A1 * | 9/2008 | Wallner | ................... | H03M 9/00 713/502 |
| 2008/0238372 A1 * | 10/2008 | Cintra | ................. | H02J 2207/20 320/137 |
| 2009/0195217 A1 * | 8/2009 | Choi | ........................ | B60K 6/28 320/152 |
| 2012/0255640 A1 * | 10/2012 | Gunnarsson | .......... | B29C 66/727 138/97 |

FOREIGN PATENT DOCUMENTS

| | | |
|---|---|---|
| JP | 10052754 A * | 2/1998 |
| JP | 10216936 | 8/1998 |
| JP | 2000102251 | 4/2000 |
| JP | 2002010644 | 1/2002 |

\* cited by examiner

WELDING OR CUTTING POWER SUPPLY USING PHASE SHIFT DOUBLE FORWARD CONVERTER CIRCUIT (PSDF)

CROSS REFERENCE TO RELATED APPLICATIONS

This application is a Continuation Application of U.S. patent application Ser. No. 12/399,698, entitled "Welding or Cutting Power Supply Using Phase Shift Double Forward Converter Circuit (PSDF)", filed Mar. 6, 2009, which is a Non-Provisional Application of U.S. Provisional Patent Application No. 61/036,598, entitled "Welding or Cutting Power Supply Using Phase Shift Double Forward Converter Circuit (PSDF)", filed Mar. 14, 2008, both of which are herein incorporated by reference for all purposes.

BACKGROUND

The present disclosure relates generally to welding and cutting power supplies, and more particularly, to a method and system for controlling a dual circuit inverter power supply.

Power supply circuits typically convert AC power to an output suitable for welding or cutting operations. The output power is provided at an appropriate voltage and/or current level and may be controlled and regulated according to the process requirements. Many industrial welding and cutting processes have dynamic load voltage and current requirements that cannot be met by a static power supply output. For instance, initiation of an arc, electrode characteristics, length of an active arc, operator technique, and so forth may all contribute to transient voltage requirements. Oftentimes, these dynamic requirements, which are above the average load conditions, are of short duration (~1 millisecond—a few seconds) and comprise only a small part of the overall welding or cutting time. Accordingly, the power supply must be capable of providing both average and dynamic load requirements.

Single or double forward converter circuits are currently used to fulfill these dual requirements. The average load requirements typically determine the thermal design of the power supply circuits, dictating the size and rating of components such as transformers, heat sinks, power devices, cooling fans and so forth. However, for welding and cutting power supplies to accommodate short dynamic loads, components capable of handling the short but extreme requirements traditionally must be chosen. This generally results in a circuit with oversized components or a lack of efficiency when the power supply is operating at average conditions. Accordingly, there exists a need for circuits that can better handle both static and dynamic load requirements without the inefficiencies of traditional designs.

BRIEF DESCRIPTION

The present disclosure provides a novel technique for dynamically adjusting an output voltage for a welding or cutting operation designed to respond to such needs. The technique allows for varying output voltage at the welding or cutting torch by manipulating the duty cycles of two forward converter circuits. In particular, the present disclosure provides methods and systems for increasing synchronized duty cycles in a pair of forward converter circuits in response to increasing output voltage demand then changing a phase shift between the duty cycles in response to further increases in output voltage demand. Present embodiments provide a controller designed to receive input signals and generate output pulse width modulation signals that control the duty cycle width and phase shift of the outputs of the forward converter circuits. Further, methods of accommodating for the time needed for the transformer core to reset via leading edge or lagging edge compensation are provided.

DRAWINGS

These and other features, aspects, and advantages of the present embodiments will become better understood when the following detailed description is read with reference to the accompanying drawings in which like characters represent like parts throughout the drawings, wherein.

Figure 13:
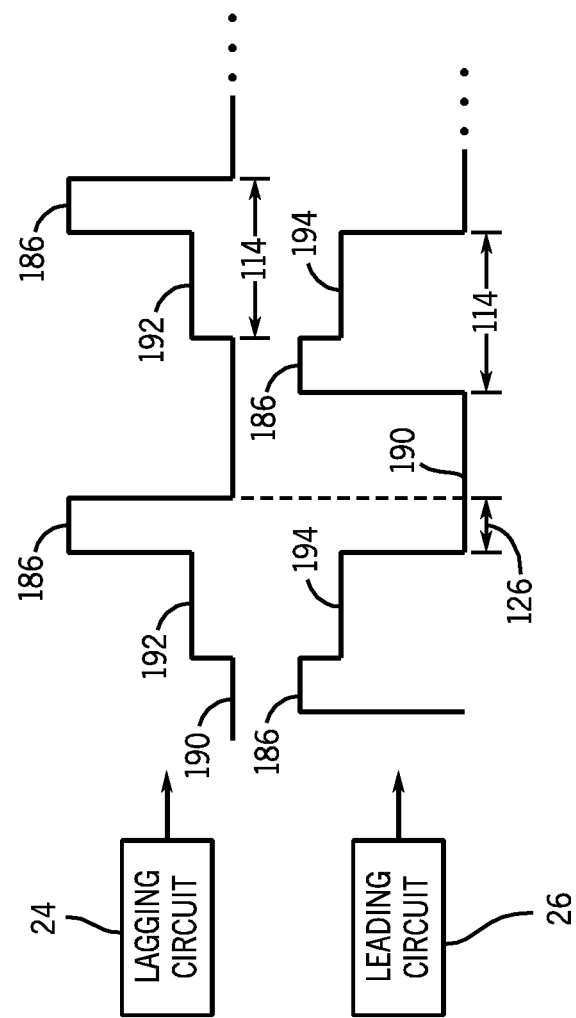
Figure 14:
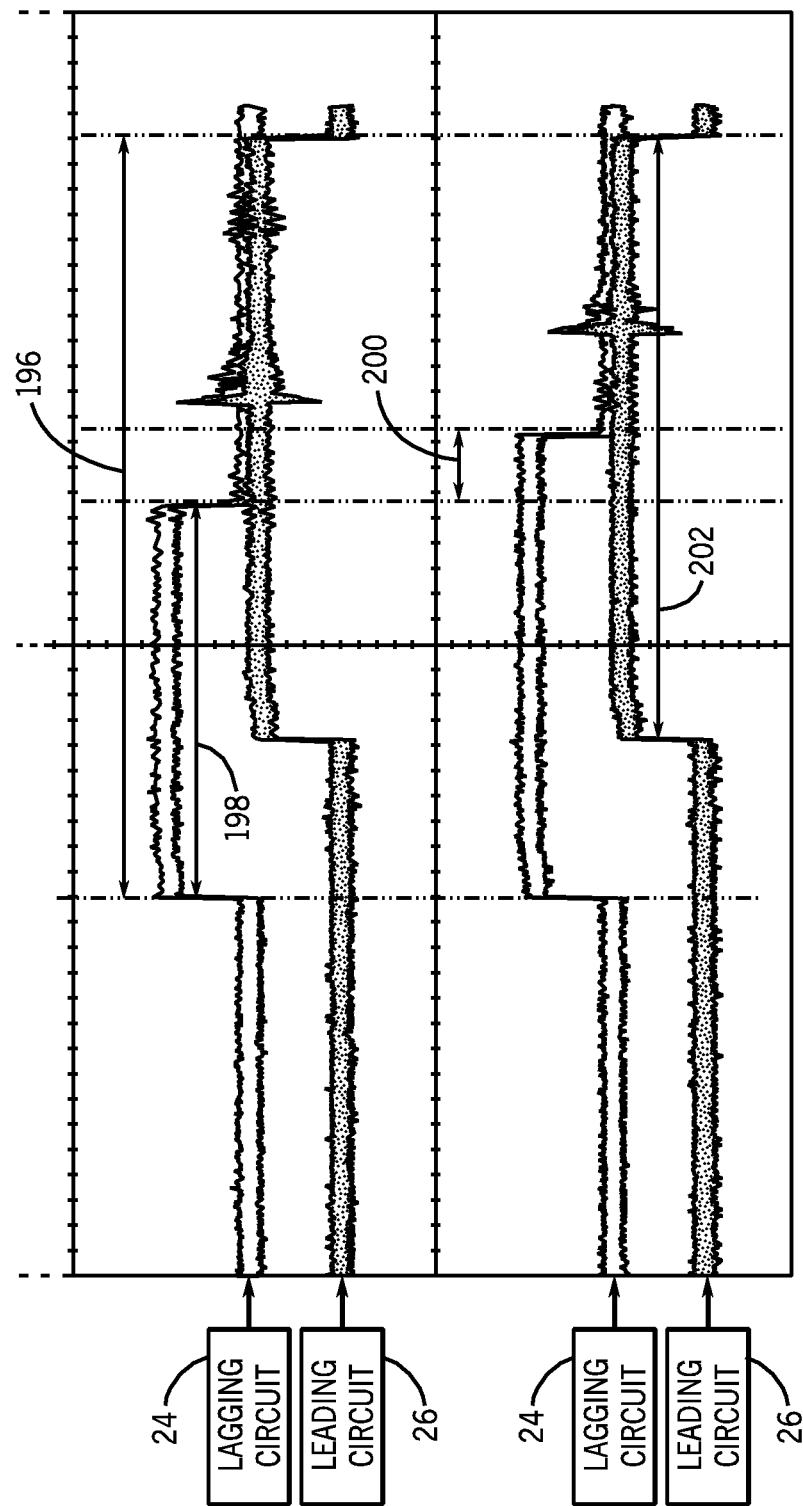

FIG. 13 is a diagrammatical representation illustrating exemplary current waveforms of two non-ideal forward converter circuits during power supply operation in accordance with aspects of the present disclosure; and FIG. 14 is a diagrammatical representation illustrating exemplary control signals generated to correct for mismatched current levels in the forward converter circuits in accordance with aspects of the present disclosure.

DETAILED DESCRIPTION

Figure 1:
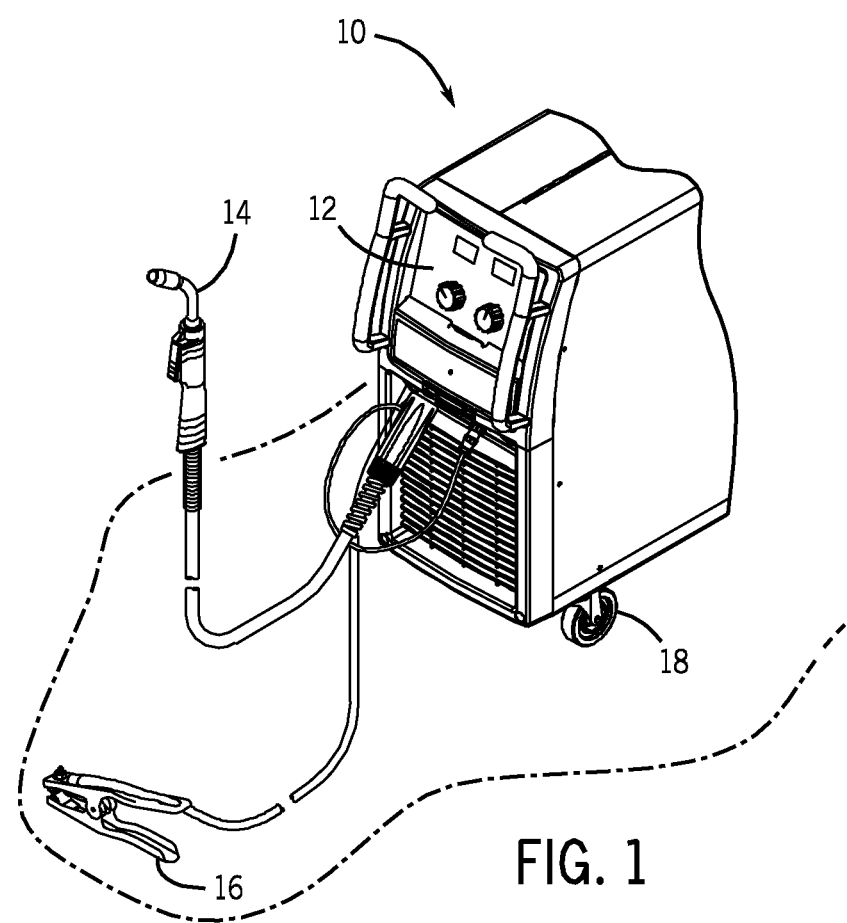
FIG. 1 is a perspective view of an exemplary welding or plasma cutting power supply unit in accordance with aspects of the present disclosure.

FIG. 1 illustrates an exemplary welding or plasma cutting power supply unit 10 which powers, controls, and provides supplies to a welding or cutting operation in accordance with aspects of the present invention. The side of the power supply unit 10 that faces the user contains a control panel 12, through which the user may control the supply of materials, such as power, gas flow, wire feed, and so forth, to a welding or cutting torch 14. A work lead clamp 16 typically connects to a workpiece to close the circuit between the torch 14, the work piece, and the supply unit 10, and to ensure proper current flow. It should be noted that in some embodiments, such as for stick welding operations, the torch 14 may be an electrode. The portability of the unit 10 depends on a set of wheels 18, which enable the user to move the power supply unit 10 to the location of the weld.

Figure 2:
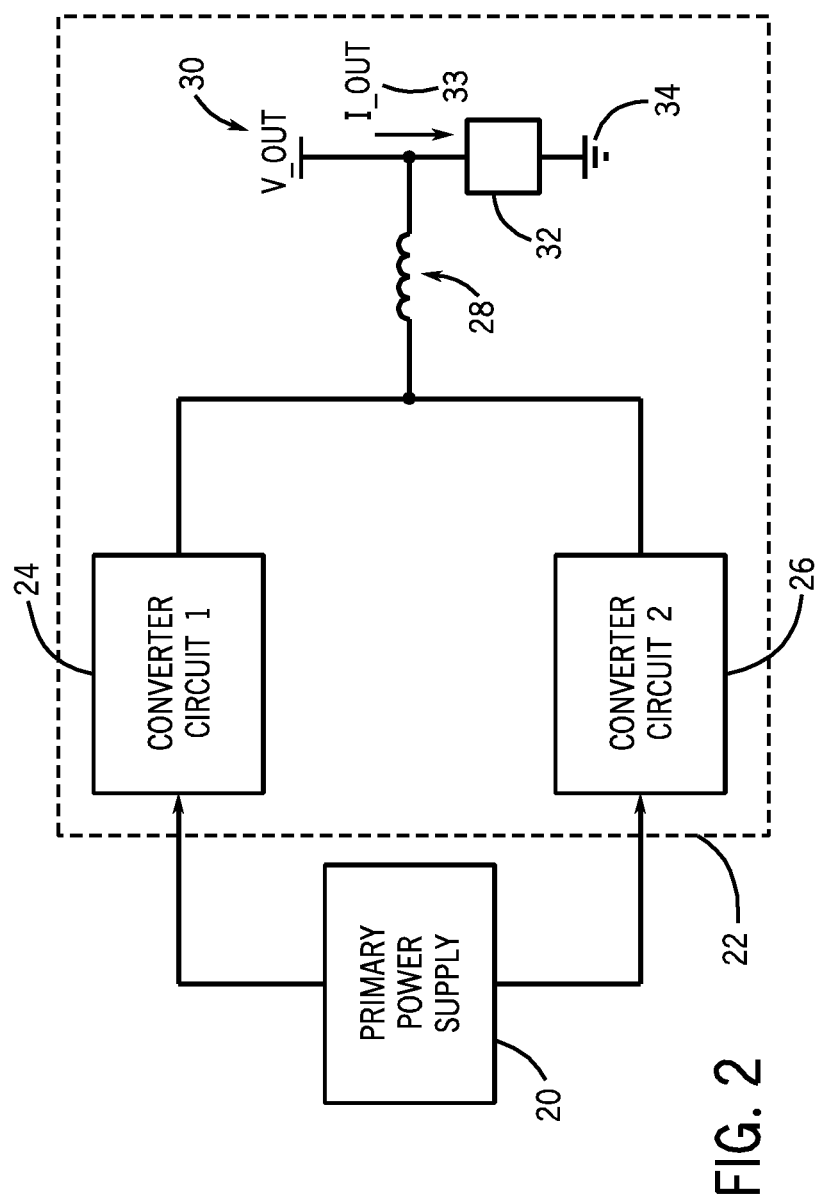
FIG. 2 is a block diagram of the components of an exemplary welding or cutting power supply in accordance with aspects of the present disclosure.

Internal components of the power supply unit 10 convert power from a wall outlet or other source of AC or DC voltage, such as a generator, battery or other source of power, to an output consistent with the voltage, current, and/or power, requirements of a welding or cutting arc maintained between the workpiece and the welding torch 14. FIG. 2 illustrates an exemplary block diagram of components that may be included in the welding or plasma cutting power supply unit 10. Specifically, FIG. 2 illustrates a primary power supply 20 which, in operation, outputs direct current (DC) to a welding or cutting power supply 22 comprising a first converter circuit 24 and a second converter circuit 26. The converter circuits 24, 26 operate to combine their respective outputs at a single node, which feeds into a filter inductor 28 that supplies an output voltage 30 (i.e. V_out) for the welding or cutting operation. The welding or cutting arc 32 is supplied with a welding or cutting current 33 and is connected to ground 34. In one embodiment, individual inductors may be utilized in place of the filter inductor 28. In other embodiments, the inductor 28 may have multiple windings used to combine the outputs of the two converter circuits 24, 26.

In one embodiment, the power supply 20 may be a DC source, such as a battery. In other embodiments, the power supply 20 may be a circuit that rectifies incoming alternating current (AC), converting it to DC. In the exemplary block diagram shown in FIG. 2, each of the converter circuits 24, 26 are connected to a single primary power supply 20. In other embodiments, the circuits 24, 26 may be powered from separate power supplies. In further embodiments, the circuits 24, 26 may be connected in parallel or series to the primary power supply 20 at the capacitors 36, 56 of the converter circuits 24, 26. In the embodiment where the circuits 24, 26 are connected in series with a single primary power supply 20, each converter circuit would only receive half the total voltage of the primary power supply 20, which may allow for the use of lower voltage components within the converter circuits 24, 26.

Figure 3:
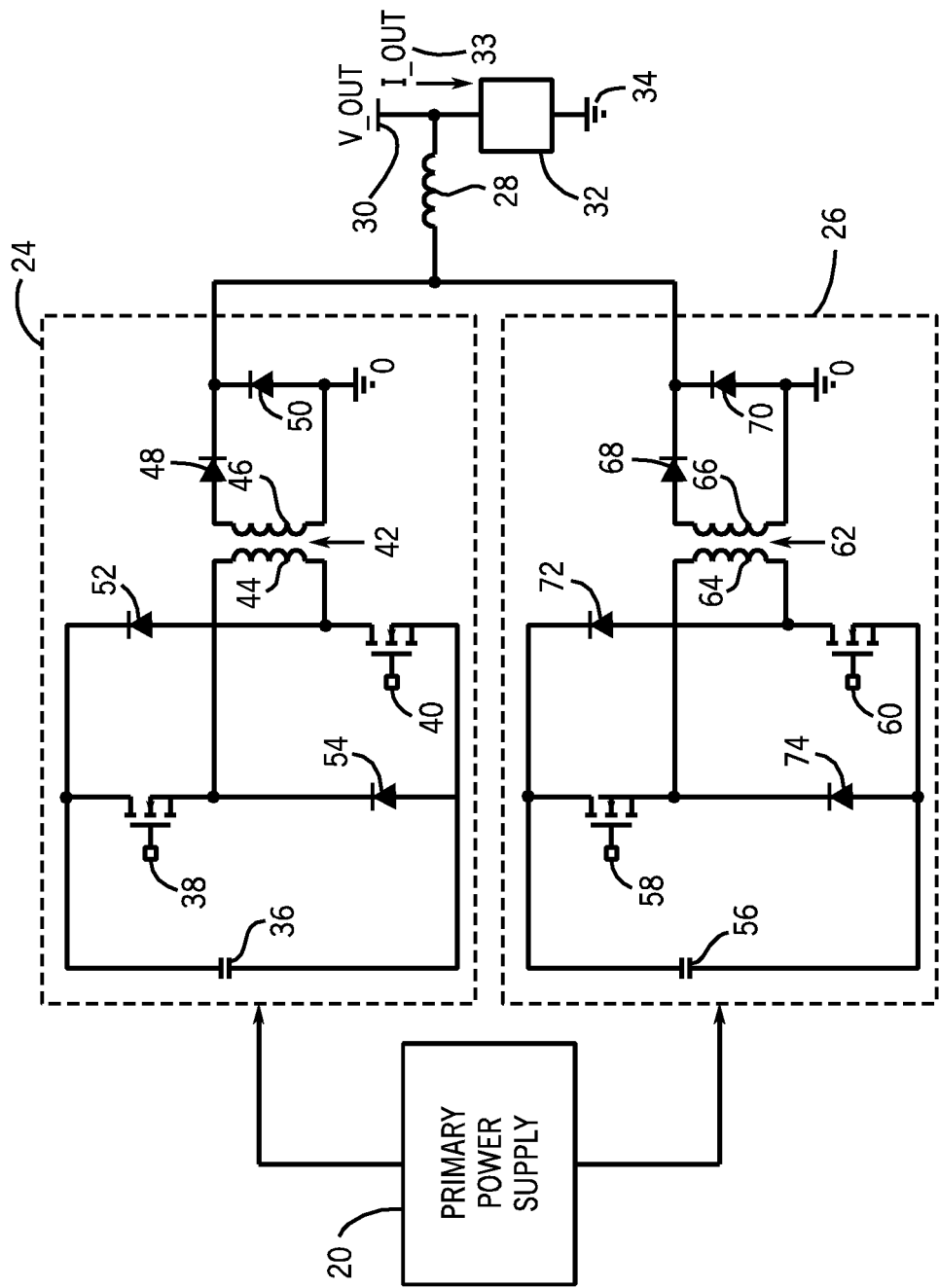
FIG. 3 is a circuit diagram illustrating an exemplary embodiment of the power supply comprising forward converter circuits in accordance with aspects of the present disclosure.

FIG. 3 is a circuit diagram illustrating one embodiment of the welding or cutting power supply 22 comprising the two forward converter circuits 24, 26 in accordance with aspects of present embodiments. As previously described, the primary power supply 20 provides DC power to the first converter circuit 24 and the second converter circuit 26. In the first inverter circuit 24, a voltage is first supplied across a capacitor 36. A pair of power semiconductor switches 38, 40 then chops the DC voltage and supplies it to a transformer 42 on the side of a primary winding 44 of the transformer 42. The transformer 42 transforms the chopped primary voltage to a secondary voltage, at a level suitable for a cutting or welding arc, and supplies it to a secondary winding 46 of the transformer 42. The secondary voltage is then rectified by rectifier diodes 48, 50 and supplied to the filter inductor 28. A set of diodes 52, 54 provide a free-wheeling path for the magnetizing current stored in the transformer 42 to flow when the pair of semiconductor switches 38, 40 turn off, and thus reset the magnetic flux or energy stored in the transformer core.

Similarly, in the second inverter circuit 26, a voltage is first supplied across a capacitor 56. A pair of power semiconductor switches 58, 60 then chops the DC voltage and supplies it to a transformer 62 on the side of a primary winding 64 of the transformer 62. The transformer 62 transforms the chopped primary voltage to a secondary voltage and supplies it to a secondary winding 66 of the transformer 62. The secondary voltage is then rectified by rectifier diodes 68, 70 and supplied to the filter inductor 28. A set of diodes 72, 74 provide a free-wheeling path for the magnetizing current stored in the transformer 62 to flow when the pair of semiconductor switches 58, 60 turn off, and thus reset the magnetic flux or energy stored in the transformer core.

The combined rectified secondary voltage is supplied to the welding or cutting power supply output 30 and a welding or cutting current 32 is output from the circuits 24, 26. In other embodiments, the forward converter circuits 24, 26 may include additional components or circuits, such as snubbers, voltage clamps, resonant "lossless" snubbers or clamps, gate drive circuits, pre-charge circuits, pre-regulator circuits, and so forth. Further, as previously noted, the forward converter circuits 24, 26 may be arranged in parallel or in series in accordance with present embodiments, meaning that the capacitors 36, 56 may be connected in series or in parallel. Additionally, in further embodiments, the output of the first converter circuit 24 and the output of the second converter circuit 26 may be connected in series. In this embodiment, a single ground would be configured to support both circuits 24, 26, and the output of the diodes 48, 50 of the first converter circuit 24 would couple with the output of the diodes 68, 70 of the second converter circuit 26 before entering the inductor 28.

Figure 4:
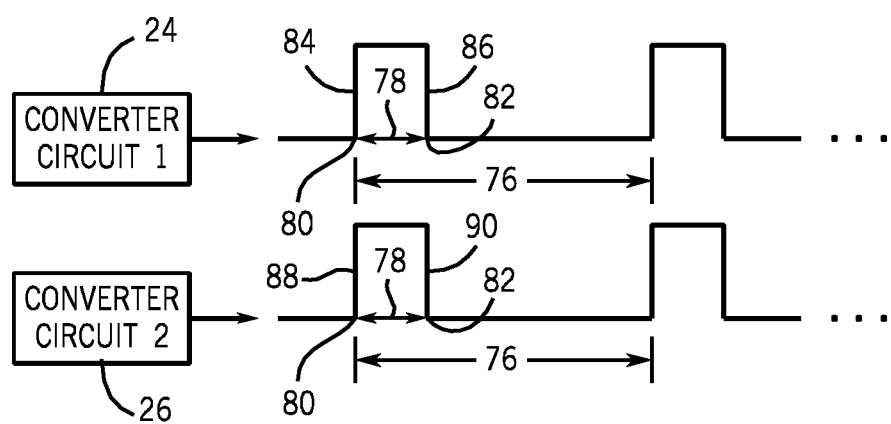
FIG. 4 is a diagrammatical representation of exemplary waveforms illustrating in phase duty cycles of two forward converter circuits in accordance with aspects of the present disclosure.

FIG. 4 is a diagrammatical representation of exemplary waveforms illustrating two possible in phase duty cycles of the two forward converter circuits 24, 26 in accordance with aspects of present embodiments. The semiconductor switches 38, 40 in the first converter circuit 24 are switched on and off during a switching period 76, defining an active period 78 for the circuit that begins at a starting time 80 and ends at a stopping time 82. The duty cycle or switch pulse width ratio for the first converter circuit 24 then becomes the active time 78 divided by the switching period 76. The active period 78 is defined by a leading edge 84 that begins the pulse and a lagging edge 86 that ends the pulse. In one embodiment, the pulse width ratio of the switches 38, 40 is limited to an upper limit of 50% of the switching period 76 so the core of the transformer 42 can naturally reset each cycle via the diodes 52, 54.

Similarly, the semiconductor switches 58, 60 in the second converter circuit 26 are switched on and off during a switching period 76, defining an active period 78 for the circuit that begins at the starting time 80 and ends at the stopping time 82. The duty cycle or switch pulse width ratio for the second converter circuit 26 then becomes the active time 78 divided by the switching period 76. The active period 78 is defined by a leading edge 88 that begins the pulse and a lagging edge 90 that ends the pulse. In one embodiment, the pulse width ratio of the switches 58, 60 is limited to an upper limit of 50% of the switching period 76 so the core of the transformer 42 can naturally reset each cycle via the diodes 72, 74. In the illustrated embodiment, the duty cycle for the first converter circuit 24 and the duty cycle for the second converter circuit 26 are equal and synchronous, dictating that the circuits are operating in phase. In such an arrangement, the welding or cutting current 32 is split between the two converter circuits 24, 26.

Figure 5:
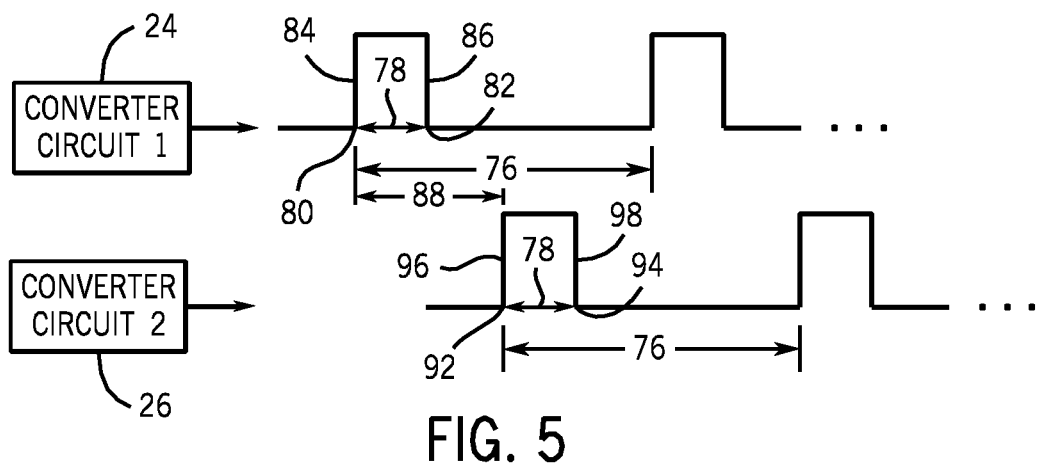
FIG. 5 is a diagrammatical representation of exemplary waveforms illustrating out of phase duty cycles of two forward converter circuits in accordance with aspects of the present disclosure.

FIG. 5 is a diagrammatical representation of exemplary waveforms illustrating two possible out of phase duty cycles of the two forward converter circuits 24, 26 in accordance with aspects of present embodiments. As previously described, the semiconductor switches 38, 40 in the first converter circuit 24 are switched on and off during a switching period 76, defining the active period 78 for the circuit that begins at the starting time 80 and ends at the stopping time 82. The duty cycle or switch pulse width ratio for the first converter circuit 24 then becomes the active time 78 divided by the switching period 76. The active period 78 is defined by the leading edge 84 that begins the pulse and the lagging edge 86 that ends the pulse. Similarly, the semiconductor switches 58, 60 in the second converter circuit 26 are switched on and off during a switching period 76, defining an active period 78 for the circuit 26 as before. However, the active period 78 now begins at a later starting time 92 and ends at a later stopping time 94 that are distinct from the starting time 80 and stopping time 82 of the first circuit 24. The duty cycle or switch pulse width ratio for the second converter circuit 26 is still the active time 78 divided by the switching period 76. However, the active period 78 is defined by a new leading edge 96 that begins the pulse and a new lagging edge 98 that ends the pulse.

In the illustrated embodiment, the duty cycle for the first converter circuit 24 and the duty cycle for the second converter circuit 26 are equal but out of phase. In one embodiment, the pulse width ratios of the pair of switches 38, 40 in the first circuit and the pair of switches 58, 60 in the second circuit are each limited to an upper limit of 50% of the switching period 76 so the core of the transformer 42 can naturally reset each cycle. However, it may be possible to achieve an effective duty cycle of approaching 100% for the combination of the two circuits since the output from each of the respective transformers combine at a common node. In the illustrated embodiment, a transformer turns ratio, meaning the secondary turns 46, 66 divided by the primary turns 44, 64 may be less than the turns ratio of a transformer in an embodiment where the two converter circuits 24, 26 operate exclusively in phase. For an embodiment where the two circuits operate in phase, the pulse width ratio of the converter switches may be limited to 50%, meaning the combined outputs at 28 are in phase and can only supply voltage or power to the inductor 28 with a pulse width ratio of 50%. In the illustrated embodiment, with the two converter circuits 24, 26 operating out of phase and each limited to 50%, the duty cycle of the combined output at the inductor 28 can approach 100%. This means the transformer turns ratio for each converter circuit 24 or 26, may be reduced by approximately 50%. As is well known in the art, the transformer turns ratio is a function of the input voltage to the converter circuit 24 or 26, the output voltage 30, and the operating duty cycle to the input of the inductor 28.

Figure 6:
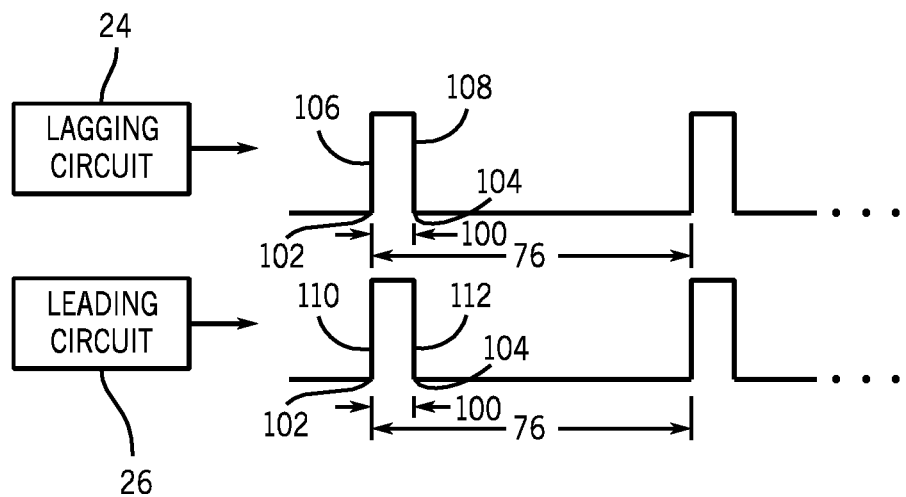
FIG. 6 is a diagrammatical representation of exemplary waveforms illustrating in phase duty cycles of two forward converter circuits operating below an upper limit in accordance with aspects of the present disclosure.
Figure 7:
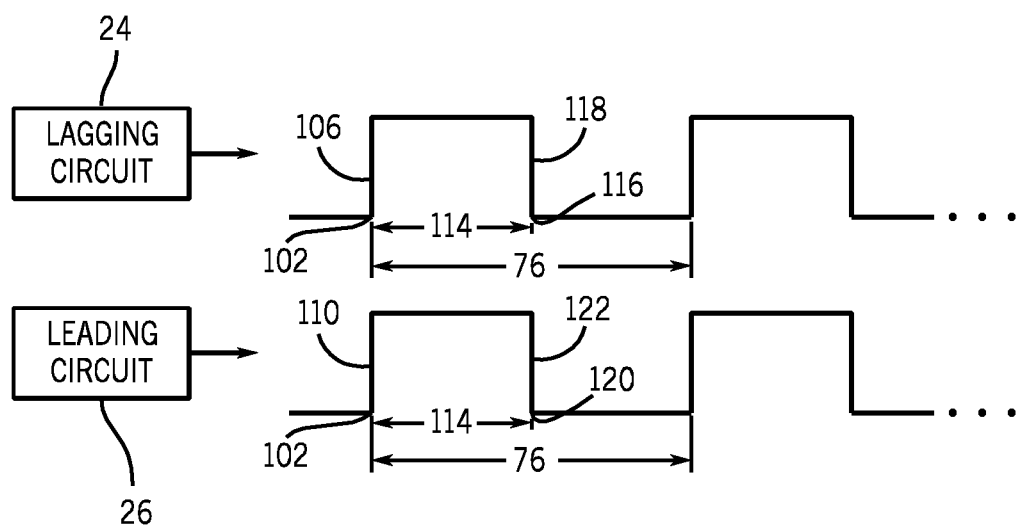
FIG. 7 is a diagrammatical representation of exemplary waveforms illustrating in phase duty cycles of two forward converter circuits operating at an upper limit in accordance with aspects of the present disclosure.
Figure 8:
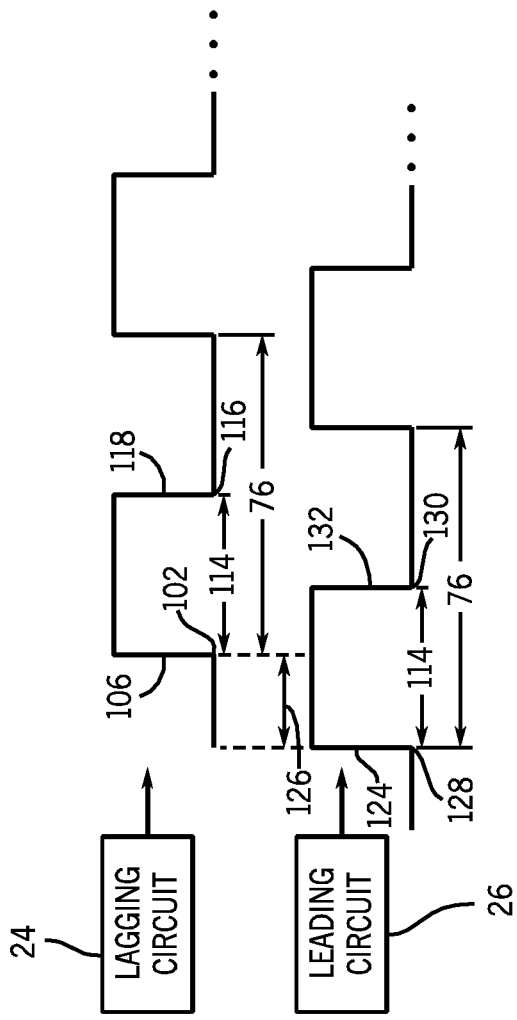
FIG. 8 is a diagrammatical representation of exemplary waveforms illustrating out of phase duty cycles of two forward converter circuits operating at an upper limit in accordance with aspects of the present disclosure.

FIGS. 6 through 8 illustrate exemplary waveforms representing outputs from the two forward converter circuits 24, 26 that may be produced during a control method in accordance with present embodiments. In this embodiment, the first converter circuit 24 may be manipulated to act like a lagging circuit 24, and the second converter circuit 26 may be manipulated to behave like a leading circuit 26. During this control method, the two inverter circuits 24, 26 may operate in phase at low duty cycles. As a control loop senses and reacts to a condition at the welding or cutting torch, such as a welding or cutting arc strike or an increase in transfer height from the torch to the workpiece, requiring greater output voltage from the inverter circuits, the duty cycle may increase until it reaches an upper limit that may be defined by the time needed for the transformer core to reset. Beyond that point, the leading circuit 26 may be shifted out of phase and can continue shifting further out of phase until the two circuits 24, 26 are fully out of phase and an upper limit output voltage is being produced by the circuits 24, 26.

FIG. 6 illustrates an output of a first step of the control method. The lagging circuit 24 output waveform is formed when the semiconductor switches 38, 40 are switched on and off during a switching period 76, defining an active period 100 for the circuit that begins at a starting time 102 and ends at a stopping time 104. The duty cycle or switch pulse width ratio for the circuit becomes the active period 100 divided by the switching period 76. The active period 100 is defined by a leading edge 106 that begins the pulse and a lagging edge 108 that ends the pulse. Similarly, the leading circuit 26 output waveform is formed when the semiconductor switches 58, 60 are switched on and off during a switching period 76, defining an active period 100 for the circuit that begins at a starting time 102 and ends at a stopping time 104. The duty cycle or switch pulse width ratio for the circuit becomes the active period 100 divided by the switching period 76. The active period 100 is defined by a leading edge 110 that begins the pulse and a lagging edge 112 that ends the pulse. The pulse width of each converter circuit is initially less than the 50% embodiment value. The duty cycle for the first converter circuit 24 and the duty cycle for the second converter circuit 26 are equal and synchronous, dictating that the circuits are operating in phase. The circuits would operate in this manner when the required output voltage was at or near the rated load, or less than rated load.

As the output voltage demand increases, the leading and lagging circuits 24, 26 synchronously increase their respective active periods until they reach an upper limit active period 114 that may be defined by the time needed for the transformer core to reset as illustrated in FIG. 7. The lagging circuit 24 duty cycle has reached an upper limit active period 114 that begins at the same starting time 102 and ends at a later stopping time 116 with respect to FIG. 6. The pulse width 114 is defined by the same leading edge 106 and a later lagging edge 118 with respect to FIG. 6. Similarly, the leading circuit 26 duty cycle has reached an upper limit active period 114 that begins at the same starting time 102 and ends at a later stopping time 120 with respect to FIG. 6. The pulse width 114 is defined by the same leading edge 110 and a later lagging edge 122 with respect to FIG. 6.

Once the duty cycles of the circuits have increased to their upper limit 114 in response to a greater voltage demand, further increases in output voltage demand must be met via a phase shift of the leading circuit 26 as illustrated in FIG. 8. The active behavior of the lagging circuit 24 remains unchanged with respect to FIG. 7 while the leading circuit 26 shifts out of phase to accommodate the further increase in voltage demand. The pulse width of the active period 114 of the leading circuit 26 remains unchanged, but the location of the leading edge 124 of the leading circuit pulse is shifted with respective to the leading edge of the lagging circuit 106 by an amount 126 dictated by the magnitude of the output voltage demand. The active period 114 of the leading circuit 26 is defined by an earlier starting time 128, a later stopping time 130, and a later lagging edge 132. The leading circuit 26 will continue to shift further out of phase as needed until the two circuits meet the output voltage demand or are fully out of phase, producing the upper limit of their collective voltage output. This type of phase modulation may occur when a transient high voltage requirement event occurs at the welding or cutting arc, such as the initiation of a welding or cutting arc. FIGS. 6-8 illustrate one embodiment in which three of the many possible combinations of pulse width and phase shift amount are shown. In other embodiments, the two converter circuits continuously respond to output voltage demand by increasing and/or decreasing duty cycle and/or phase shift amount as needed.

The forward converter circuits 24, 26 use a natural transformer core reset mechanism where the magnetizing current can naturally flow through the free-wheeling diodes 52, 54 of the first converter circuit 24 and the free-wheeling diodes of the second converter circuit 72, 74 during an OFF interval of the switches of the first converter circuit 38, 40 and the switches of the second converter circuit 58, 60, to allow the transformer cores to reset, where the OFF interval refers to the portion of the switching period 76 that the circuit is not active. A method for allotting sufficient time for the transformer core to complete its natural reset cycle during phase shifting may need to be employed. In one embodiment, the leading circuit 26 would skip a pulse when the phase shift value was increasing or decreasing to reset to the proper phase shift. Outputs for other possible embodiments of such a method are illustrated by the exemplary waveforms in FIGS. 9 and 10.

Figure 9:
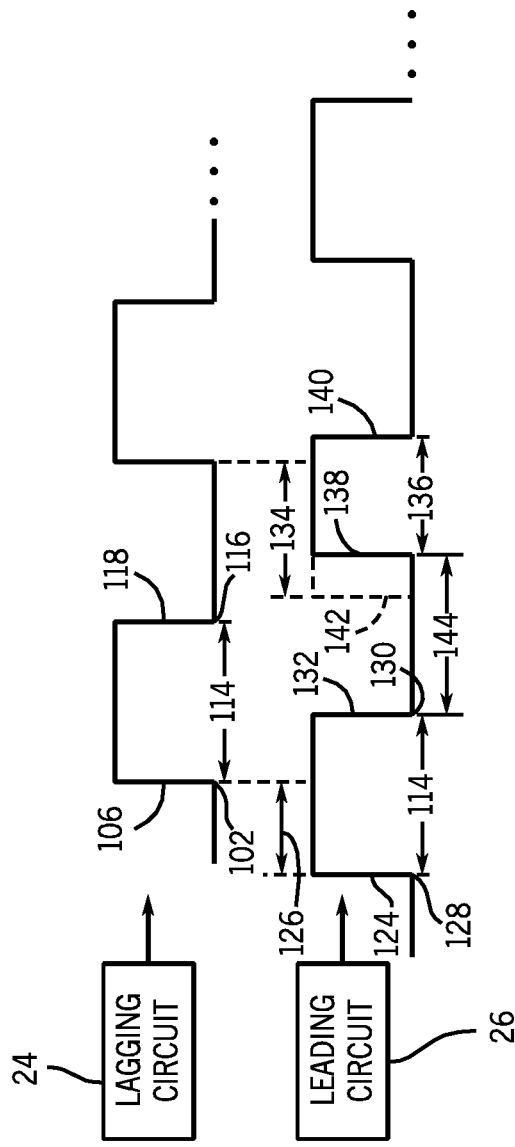
FIG. 9 is a diagrammatical representation of exemplary waveforms illustrating duty cycles of two forward converter circuits shifting out of phase via leading edge compensation in accordance with aspects of the present disclosure.

FIG. 9 is a diagrammatical representation of exemplary waveforms illustrating duty cycles of the two forward converter circuits 24, 26 shifting out of phase and compensating for the necessary transformer core reset time via leading edge compensation. In this embodiment, the lagging circuit 24 proceeds as previously described with respect to FIG. 6. The semiconductor switches 38, 40 are switched on and off, defining an active period 114 that begins at a starting time 102 and ends at a stopping time 116. The active period 114 is defined by a leading edge 106 that begins the pulse and a lagging edge 118 that ends the pulse, defining a duty cycle operating at an upper limit. However, the leading circuit 26, which was operating at an upper limit of its duty cycle 114 and an initial phase shift 126, must again shift to a new phase shift value 134 to accommodate a further increase in voltage output demand at the welding or cutting torch. To allow sufficient time for the transformer core to reset, some action must be taken to reduce the pulse width of the next pulse during the time that the phase shift is increasing. The embodiment in FIG. 9 shows a single reduced pulse width 136 formed by a new leading edge 138 and a new lagging edge 140, which reflect a delay in the desired leading edge 142 to allow for a full off period 144 for the transformer core to reset. Succeeding pulses would return back to the original upper limit pulse width 114 at the new phase shift value 134.

Figure 10:
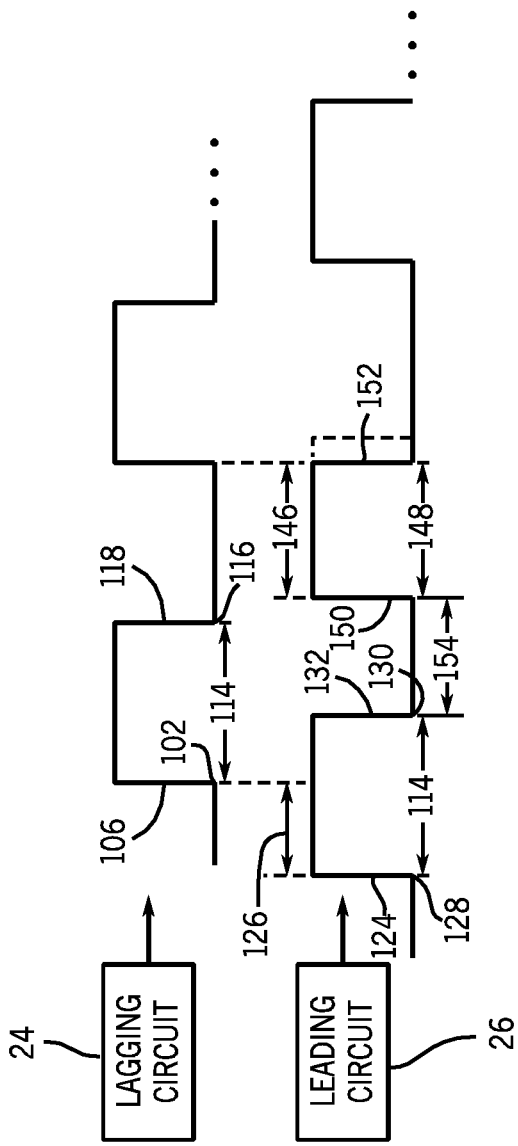
FIG. 10 is a diagrammatical representation of exemplary waveforms illustrating duty cycles of two forward converter circuits shifting out of phase via lagging edge compensation in accordance with aspects of the present disclosure.

FIG. 10 is a diagrammatical representation of exemplary waveforms illustrating duty cycles of two forward converter circuits shifting out of phase and compensating for the necessary transformer core reset time via lagging edge compensation. In this embodiment, the lagging circuit 24 proceeds as previously described with respect to FIG. 6. The semiconductor switches 38, 40 are switched on and off, defining an active period 114 that begins at a starting time 102 and ends at a stopping time 116. The active period 114 is defined by a leading edge 102 that begins the pulse and a lagging edge 116 that ends the pulse, defining a duty cycle operating at an upper limit. However, the leading circuit 26, which was operating at an upper limit of its duty cycle 114 and an initial phase shift 126, must again shift to an increased phase shift value 146 to accommodate a further increase in voltage output demand at the welding or cutting torch. As previously stated, to allow sufficient time for the transformer core to reset, some action must be taken to reduce the pulse width of the next pulse during the time that the phase shift is increasing. The embodiment in FIG. 10 shows a single reduced pulse width 148 formed by a new leading edge 150 and a new lagging edge 152. In this embodiment, the desired start time of the leading edge 150 according to the new phase shift value 146 is not altered. Instead, an early lagging edge 152 is initiated to accommodate the need for adequate transformer core reset time. Even though the transformer core was not fully reset before the onset of the next pulse, as indicated by the shortened inactive period 154, it was driven by a pulse of reduced width due to the early onset of the lagging edge 152 so that the peak flux in the transformer core at the end of the reduced pulse was no greater than it would be after a normal cycle when full reset was allowed to occur. Succeeding pulses would return back to the original upper limit pulse width 114 at the increased phase shift value 146.

Figure 11:
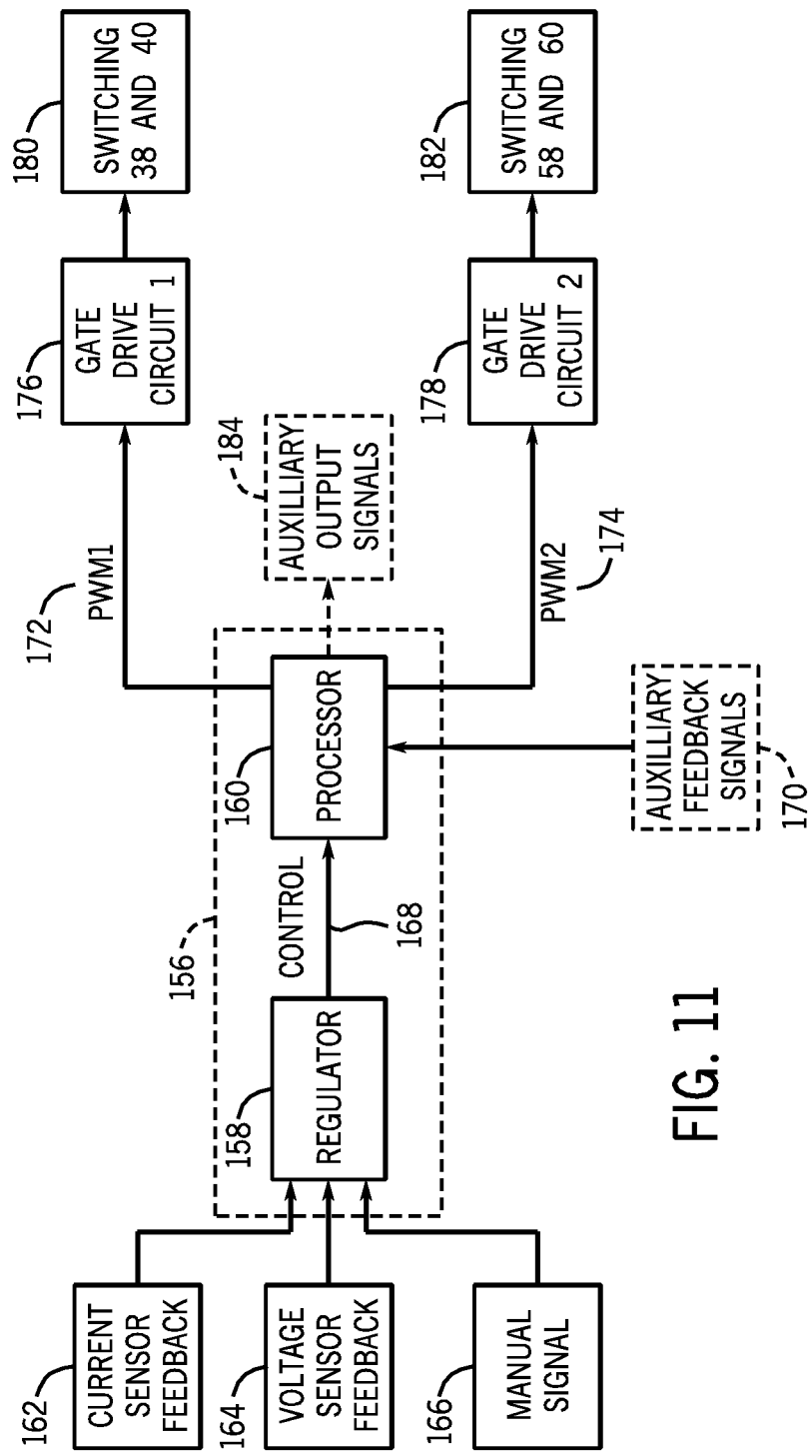
FIG. 11 is a block diagram illustrating exemplary processing logic that may be used to control the pulse width modulation of the power supply output in accordance with aspects of the present disclosure.

FIG. 11 is a block diagram illustrating exemplary processing logic that may be used to control the pulse width modulation of a power supply output. In accordance with aspects of present embodiments, in the illustrated embodiment, a controller 156 comprising a regulator 158 and a processor 160 controls switching of forward converter circuits (e.g. forward converter circuits 24, 26) to achieve the desired voltage and/or current output at the welding or cutting torch 14. In one embodiment, the controller 156 may use feedback information to prevent the converter circuits 24, 26 from operating continuously in a full or partially phase shifted manner. Additionally, the controller 156 may take other actions to protect or prolong the life of the converter circuits 24, 26, such as reducing the output load current when operating beyond a certain time limit in a phase shift mode. These actions could be taken to prevent the two inverter circuits 24, 26 from operating for an excessive amount of time in a phase shifted mode at high currents, in the event of some abnormal dynamic load at the torch 14. The controller 156 may also prevent the converter circuits 24, 26 from operating in a phase shifted mode if the output current is greater than some defined level.

The regulator 158 is configured to receive multiple inputs regarding the desired and actual output voltage, current, power, and so forth. For instance, the regulator 158 may receive feedback from a current sensor 162 and/or voltage sensor 164 at the welding or cutting torch 14. Additionally, the regulator 158 may receive a manual input 166 from push buttons, a user interface, voice command, and so forth, regarding a desired set point or output. The regulator 158 then generates an output control signal 168 based on its inputs. In one embodiment, the regulator 158 may include an error amplifier and compensation network and may be implemented with discrete circuits or software algorithms within the processor 160 or controller 156. The processor 160 may receive auxiliary feedback or input signals 170 such as temperature feedback, monitoring signals, control signals, and so forth. The control signal 168 is also received by the processor 160 and is used to set the required pulse width modulation (PWM) signals, PWM1 172 and PWM2 174. The individual PWM signals 172, 174 may include pulse width and phase shift values as dictated by the output demand of the system. The two PWM outputs 172, 174 are connected to two gate drive circuits 176, 178 to provide the necessary gate drive signals to drive the switching of the first converter circuit 180 and the switching of the second converter circuit 182. In certain embodiments, the processor 160 may output additional auxiliary signals 184, such as analog or digital outputs for monitoring and control of aspects of the welding or cutting power supply. Auxiliary signals 184 may include fan control signals, pre-charge relay signals, timing signals for other power circuits such as a pre-regulator circuit, and so forth.

Figure 12:
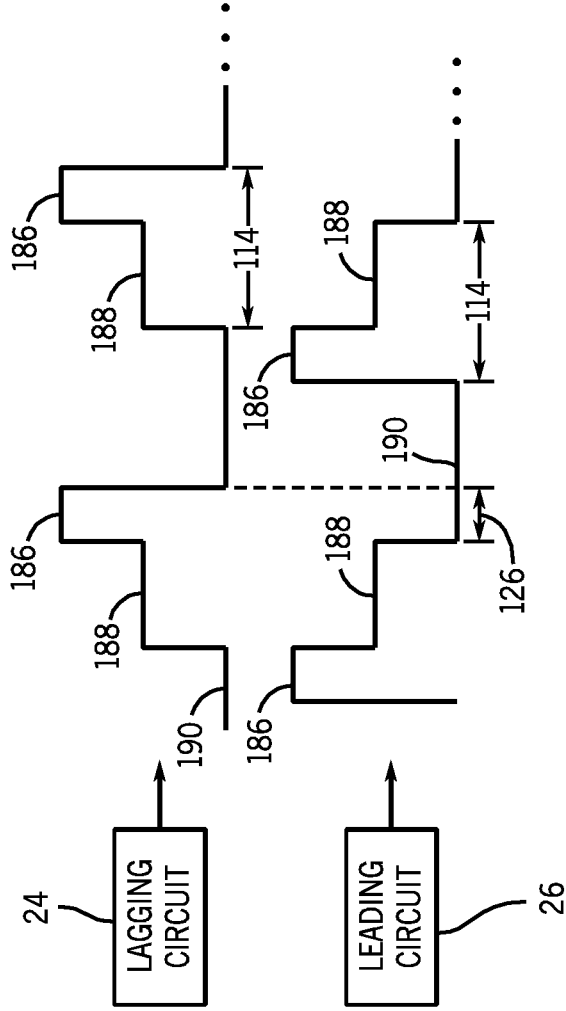
FIG. 12 is a diagrammatical representation illustrating exemplary current waveforms of two ideal forward converter circuits during power supply operation in accordance with aspects of the present disclosure.

As a control method in accordance with present embodiments is implemented, the active states and phase shifts of the converter circuits 24, 26 may be altered, and current flow waveforms may be generated. For a particular phase shift and duty cycle, the exemplary current waveforms shown in FIG. 12 may be generated for an ideal circuit (i.e. a circuit with optimal transformer coupling and so forth). In one embodiment, when either the leading converter circuit 26 or the lagging converter circuit 24 is exclusively on, the respective semiconductor switches, either 38 and 40 or 58 and 60, will carry the full peak current 186, which is dictated by the welding load or output current of the combined circuit outputs and the transformer turns ratios, as previously described. The full peak current 186 is effectively the output current multiplied by the transformer turns ratio. During the time when both converter circuits 24, 26 are active, the load output current will split between the two circuits such that each carries approximately half of the peak current 188. The output current multiplied by the turns ratio of the transformer 28 results in each converter circuit 24 or 26 carrying one half of the peak current. During the time when only one converter circuit is active, the other converter circuit will carry no current 190. When the two converter circuits are fully in phase, such as would occur when operating at a rated load operating point, the currents in the primary switches 38, 40, 58, 60 will be at approximately half of the peak current for the full active portion of the cycle for each inverter circuit.

For a particular phase shift and duty cycle, the exemplary current waveforms shown in FIG. 13 may be generated for a non-ideal circuit (i.e. a circuit with real components). In one embodiment, when either the leading converter circuit 26 or the lagging converter circuit 24 is exclusively on, the respective semiconductor switches, either 38 and 40 or 58 and 60, will carry the full peak current 186, which is dictated by the welding load or output current 33 of the combined circuit outputs and the transformer turns ratios, as previously described. During the time when both converter circuits 24, 26 are active, the load output current 192 in the lagging circuit 24 is lower than ideally expected (~50% of the peak current) with respect to FIG. 12. Since the total peak current remains the same with respect to FIG. 12, the leading circuit 26 carries a current 194 that is higher than ideally expected (~50% of the peak current) to compensate for the decrease in current in the lagging circuit 24. During the time when only one converter circuit is active, the other converter circuit will carry no current 190.

This non-ideal sharing occurs because the voltage on the secondary winding 46 of the transformer 42 of the lagging circuit 24 is approximately equal to the voltage on the secondary winding 66 of the transformer 62 that the leading circuit 26 is providing. This voltage reflects to the primary winding 44 of the transformer 42 of the lagging circuit 24 and is nearly equal to the voltage available to drive the lagging circuit 24. Accordingly, there exists very little forcing voltage to overcome the leakage inductance in the transformer 42 of the lagging circuit 24 until the leading circuit 26 enters an inactive state, and the secondary voltage approaches zero. At that point, the full voltage is available to ramp up the current in the primary winding 44 of the transformer 42 of the lagging circuit 24, and it quickly adjusts to carry the full peak current.

For transient, dynamic load conditions, the described mismatch in the current carried by the converter circuits 24, 26 may be insignificant. However, in response to loads of longer durations or for embodiments in which the circuits 24, 26 are arranged in series, it may be desirable to balance the currents carried by the inverter circuits 24, 26 to distribute power losses and heat generated during operation. The mismatch in average current carried by the converter circuits 24, 26 may cause a mismatch in voltages between the converter circuits 24, 26, causing unequal splitting of the total input voltage from the primary power supply 20 when the circuits 24, 26 are connected in a series arrangement. This mismatch in voltage for the series arrangement may cause excess voltage stress on the components of the converter circuits 24, 26. In one embodiment, this voltage mismatch may be compensated for by splitting the overlap time between the two circuits 24, 26 when they are operating in a phase shifted mode. The duty cycles of the leading and/or lagging circuit 24 and/or 26 may be adjusted such that the leading circuit 26 does not carry significantly more average current than the lagging circuit 24. In one embodiment, this adjustment would comprise alternating which converter circuit 24 or 26 is the leading circuit during operation such that the circuit that carries a greater portion of the peak current alternates.

In another embodiment as illustrated in FIG. 14, information regarding whether the center point of the primary power supply input voltages for each of the circuits 24, 26 is greater or lesser than half of the total supplied primary power supply voltage may be acquired and used to compensate for the mismatch in current carried by the circuits 24, 26. In one embodiment, a comparator circuit may indicate this information and provide it to the controller 156 by a single digital input line. This line may indicate whether the center point is too high or too low for equal current sharing between the two circuits 24, 26. The controller 156 may then signal a duty cycle change in the circuits 24, 26 to correct for the mismatch. FIG. 14 illustrates two sets of waveforms showing the control signals for two different time points. The controlling variable 196 for the voltage output is identical for the two sets of waveforms, indicating that the desired voltage output has been maintained. The waveforms illustrate a larger leading duty cycle 198 and a reduced leading duty cycle 200, indicating that the active time of the lead converter circuit has been modified as required to correct for the unequal split of the primary power supply output voltage. The duty cycle of the lagging circuit remains the same 202. Effectively, the duty cycle of the leading converter 26 may be modulated in response to sensed variations in the center point of the primary power supply output voltage. Additionally, it may be necessary or desirable under certain load conditions to modify or modulate the duty cycle of the lagging circuit 24, as a further means of reducing a mismatch in the voltages between the converter circuits 24, 26. Other embodiments may provide multiple signals or other types of signals, such as analog feedback signals indicating the magnitude of the voltages applied to the two converter circuits, to the controller 156. These signals may be used in place of or in addition to the single digital input line described.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding or cutting system, comprising:
a pair of forward converter circuits to coordinate an increase in a voltage requirement for a welding or cutting output; and
a controller, comprising:
a regulator to receive at least one input related to a desired combined welding or cutting output for the pair of forward converter circuits, and generate a control signal in response to the at least one input; and
a processor to receive the control signal and to drive forward converter circuits based on the control signal, the processor programed to:
adjust a duty cycle of a first forward converter circuit and a duty cycle of a second forward converter circuit of the pair of forward converter circuits based on the control signal; and
delay initiation of a new pulse for one of the first or second forward converter circuit when the voltage or current indicates that the transformer has not been reset such that a pulse width of the new pulse is different than a pulse width of a subsequent pulse, resulting in the duty cycle of the first forward converter circuit is different than the duty cycle of the second forward converter circuit, and resulting in the first forward converter circuit is synchronized with the second forward converter circuit after the transformer is reset to output a combined welding or cutting output.

2. The welding or cutting system of claim 1, wherein the processor is configured to receive a temperature signal and adjust the switches to accommodate a desired temperature setting.

3. The welding or cutting system of claim 2, wherein the pair of forward converter circuits are arranged in parallel.

4. The welding or cutting system of claim 2, wherein the pair of forward converter circuits are arranged in series.

5. The welding or cutting system of claim 1, wherein the processor is configured to output an additional control signal for an auxiliary device.

6. The welding or cutting system of claim 5, wherein the auxiliary device comprises a fan.

7. The welding or cutting system of claim 1, wherein the regulator is to receive a measured value for an actual output from an output sensor.

8. The welding or cutting system of claim 1, comprising a phase shift duration controller configured to limit continuous operation in a phase shifted manner.

9. The welding or cutting system of claim 1, wherein the processor is to facilitate an increase in the duty cycles to a maximum limit by shifting outputs of the pair of forward converter circuits fully out of phase.

10. The welding or cutting system of claim 1, wherein the duty cycle of the first forward converter circuit is adjusted from a first duty cycle to a second duty cycle greater than the first duty cycle.

11. The welding or cutting system of claim 1, wherein the pair of forward converter circuits constitute a Phase Shift Double Forward Converter Circuit (PSDF) type of circuitry.

12. The welding or cutting system of claim 1, wherein the processor is configured to adjust a second phase shift between the duty cycles in response to a third increase in the voltage requirement.

13. A welding or cutting system, comprising:
a pair of forward converter circuits to coordinate an increase in a voltage requirement for a welding or cutting output; and
a controller, comprising:
a regulator to receive at least one input related to a desired combined welding or cutting output for the pair of forward converter circuits, and to generate a control signal; and
a processor to receive-the control signal from the regulator and to drive switches in the pair of forward converter circuits based on the control signal, the processor programed to:
adjust a duty cycle of a first forward converter circuit and a duty cycle of a second forward converter circuit of the pair of forward converter circuits based on the control signal in response to a first increase in the voltage requirement such that a pulse width of a first pulse from the first forward converter circuit is different than a pulse width of a subsequent pulse; and
adjust a phase shift between the duty cycles upon reaching an upper limit for each of the duty cycles in response to a second increase in the voltage requirement to return to original upper limit pulse width.

14. The welding or cutting system of claim 13, wherein the processor is configured to pass all available current through the first forward converter circuit when the first and second forward converter circuits are operating completely out of phase.

* * * * *